US012764270B2

(12) United States Patent
Ferrario et al.

(10) Patent No.: US 12,764,270 B2
(45) Date of Patent: Oct. 13, 2026

(54) DEPTH SCANNING IMAGE SENSOR

(71) Applicant: IMASENIC Advanced Imaging S.L., Barcelona (ES)

(72) Inventors: Andrea Ferrario, Barcelona (ES); Andrew Scott, Barcelona (ES); Adria Bofill Petit, Barcelona (ES); Renato Turchetta, Barcelona (ES)

(73) Assignee: IMASENIC Advanced Imaging S.L, Barcelona (ES)

( * ) Notice: Subject to any disclaimer, the term of this patent is extended or adjusted under 35 U.S.C. 154(b) by 92 days.

(21) Appl. No.: 18/842,137

(22) PCT Filed: Feb. 28, 2023

(86) PCT No.: PCT/EP2023/055026
§ 371 (c)(1),
(2) Date: Aug. 28, 2024

(87) PCT Pub. No.: WO2023/161529
PCT Pub. Date: Aug. 31, 2023

(65) Prior Publication Data

US 2025/0184468 A1 Jun. 5, 2025

(30) Foreign Application Priority Data

Feb. 28, 2022 (EP) .................................... 22382171

(51) Int. Cl.
*H04N 13/296* (2018.01)
*H04N 13/254* (2018.01)
(Continued)

(52) U.S. Cl.
CPC ......... *H04N 13/296* (2018.05); *H04N 13/254* (2018.05); *H04N 13/289* (2018.05);
(Continued)

(58) Field of Classification Search
CPC ........ G01S 17/18; G01S 17/89; G01S 17/894; G01S 7/4863
See application file for complete search history.

(56) References Cited

U.S. PATENT DOCUMENTS

2015/0319422 A1 11/2015 Fereyre et al.
2019/0250257 A1 8/2019 Finkelstein et al.
2022/0328548 A1* 10/2022 Lee ........................ H04N 25/78

FOREIGN PATENT DOCUMENTS

WO 2008138543 A1 11/2008
WO 2012013918 A1 2/2012
(Continued)

OTHER PUBLICATIONS

Bub et al.,Temporal pixel multiplexing for simultaneous high-speed, high-resolution imaging, Nature Methods vol. 7, pp. 209-211 (2010).

*Primary Examiner* — Jamie J Atala
(74) *Attorney, Agent, or Firm* — 24IP Law Group USA, PLLC; Timothy R DeWitt

(57) ABSTRACT

A imaging device according to the present disclosure comprises a pixel array comprising a plurality of pixels; a signal generator for generating an exposure timing scheme defining exposure durations for ones of the pixels grouped in at least one subgroup of the pixels, wherein ones of the exposure durations cover at least portions between a frame start time and a frame end time of predefined frame; a synchronizer for synchronizing a generation of a light pulse with the exposure timing scheme; and means for readout of charges accumulated in grouped ones of the pixels.

17 Claims, 11 Drawing Sheets

(51) Int. Cl.
*H04N 13/289* (2018.01)
*H04N 25/50* (2023.01)
*H04N 25/705* (2023.01)
*H04N 25/78* (2023.01)

(52) U.S. Cl.
CPC ........... *H04N 25/50* (2023.01); *H04N 25/705* (2023.01); *H04N 25/78* (2023.01)

(56) References Cited

FOREIGN PATENT DOCUMENTS

| | | | | | |
|---|---|---|---|---|---|
| WO | WO-2015164836 | A1 | * | 10/2015 | ....... A61B 17/12031 |
| WO | 2019239128 | A1 | | 12/2019 | |
| WO | WO-2021067377 | A1 | * | 4/2021 | ............ G01S 17/18 |

* cited by examiner

DEPTH SCANNING IMAGE SENSOR

BACKGROUND OF THE INVENTION

Field of the Invention

The present disclosure is directed to a novel sensor device for 2D (two-dimensional) imaging and for 3D (three-dimensional) imaging. The present disclosure is further directed to a method for 2D imaging and for 3D imaging. The present disclosure is moreover directed to a device for scanning depth and to a method for scanning depth.

Brief Description of the Related Art 3D imaging has been around for decades. Increased demand for imaging solutions and technological evolution have resulted in a broad spectrum of applications.

3D imaging is useful in different fields. For example, depth sensing has gained importance in the automotive industry in application areas, such as prevention of car crash, monitoring of the physical conditions of the car driver, or autonomous driving. Such applications require substantially real-time responses to be effective.

In medical diagnosis and surgery, delicate and rare operations have been made feasible thanks to the ability to reproduce the structure and locations of internal organs based on 3D imaging, which enables surgeons to train operations in advance. For this kind of application, slow and precise scanning systems to generate the 3D images can be used since there is no need for real time operation.

In the areas of security and data protection, face recognition in combination with fingerprinting can provide a method to protect people from theft of their personal data. Here, again, relatively slow systems can be used for 3D imaging since the main issue is to create a detailed 3D image of the object, e.g., of the face and/or the fingerprint, and real time response is not a concern. Structured light systems and multi camera systems are widely used for this purpose.

Some imaging techniques build on depth information. To gain depth information, various solutions for depth detection have been developed. Depending on the application in question, some of these solutions may be more suitable than others.

Stereovision, which is a known 3D imaging technique, obtains 3D geometric information of an object from multiple images based on the principle of human binocular vision. Two images of the object are acquired simultaneously or consecutively from different viewing angles and these two images are used to derive the object's 3D geometric information based on trigonometry. The object's 3D profile and location can thereby be calculated. The stereovision method is a well-developed 3D imaging technique yielding satisfactory results. However, the stereovision method is computationally intensive and can perform poorly when baseline distance is large. In active stereo vision, structured light is additionally used. The stereovision method may be enhanced by using a structured light source (active stereovision). As mentioned before, the stereovision method may use two sensors and was an early technique to produce 3D images (see, e.g., the Fujifilm FinePix Real 3D).

In the structured-light technique, a three-dimensional object is illuminated by projecting a pattern of light onto the surface of the object. One example of the pattern of light are parallel stripes of light. Due to the three-dimensional structure of the object, the illumination pattern looks different on the surface of the three-dimensional object than on a planar surface, i.e., the illumination pattern is reflected differently from the three-dimensional object than from the planar surface. From the way the projected light pattern looks in the image reconstruction of the three-dimensional structure of the object can be achieved. The structured-light technique may employ a light source made of points with a known geometry. The structure-light technique was used in, e.g., the iPhone 8

A further known technique is time-of-flight (TOF) imaging, in which light with a known temporal profile impinges on a three-dimensional object and is reflected to a camera. The time for the light to reach the camera depends on the distance of the point of reflection on the surface of the object to the camera. Knowledge of this time enables the three-dimensional structure of the object to be inferred. The light may be modulated. By sampling the reflected light at a high frequency, the camera or sensor measures the phase of the reflected light with respect to the emitted light. The phase is related to the distance of the point on the object from which light was reflected. This method is called indirect TOF or i-TOF.

More recently, and thanks to the improvements in avalanche detectors, silicon photomultipliers (SiPMs), avalanche photodiodes (APDs), or single-photon avalanche diodes (SPADs), direct TOF (dTOF) has gained increased importance in 3D imaging methods. It is known that avalanche detectors can generate a large voltage signal when capturing a single electron. This voltage signal can then be used to precisely measure the time of arrival of one photon. With the equation $$d = \frac{1}{2} \cdot c \cdot \Delta t,$$

where c is the speed of light and Δt is the interval between the instant at which the light pulse is generated and the reflected pulse is detected on the sensor, the distance d at which the object is located can be calculated.

The SPADs have been available based on CMOS technology, which enables the fabrication of large arrays of SPADs. The performance of CMOS-based SPADs still does not meet the performance levels of the SPADs, made by an optimized fabrication technology, but has been continuously improving and enables the creation of small arrays.

The technology of the SPADs is described, for example, in the international patent application No. WO 2021/067377 A1 (Sense Photonics/University of Edinburgh). This patent application discloses a light detection and ranging (LIDAR) system including an emitter array comprising a plurality of emitter units operable to emit optical signals, a detector array comprising a plurality of detector pixels (such as SPADs) operable to detect light for respective strobe windows between pulses of the optical signals, and one or more control circuits.

However, the SPADs suffer from drawbacks. The fill factor, i.e., the ratio of a SPAD's light sensitive area to the SPAD's total area, can be limited. The SPADs require use of surface area on a chip for the drive circuitry to be operative. A further drawback is that is that the quantum efficiency is low, especially in the near infrared (NIR) region in which dTOF operates for eye-safety reasons and improvements of the signal-to-noise ratio (SNR) by reducing background light. Furthermore, SPADs have a relatively high-power consumption.

A technique called Temporal Pixel Multiplexing (TPM) is described in the international patent application No. WO 2008/138543 A1. Bub et al. (see, e.g., Nature Methods volume 7, pages 209-211 (2010)) implemented TPM by using digital micromirror devices (DMD) and a CCD image sensor. High-speed imaging can be achieved by grouping pixels into pixel subsets having serial exposure timings to generate a frame per pixel subset. This results in a set of time-separated low-resolution images. The low-resolution images can then be viewed in sequence as a movie or can be combined to form a single high-resolution image.

In a further development, the international patent application No. WO 2012/013918 A1 discloses a pixel design for CMOS sensors which allows for selection of individual pixels. The TPM can be implemented electronically on chip using the disclosed CMOS sensors, without the use of any electro-mechanical moving parts. A pixel circuit is described which has as inputs a shutter signal, a column select signal, and a row select signal.

International patent application No. WO 2019/239128 A1 discloses a pixel design in which a column sample signal and a row sample signal can be provided to each pixel to read an exposure signal into a storage node of the pixel. The storage node is arranged such that both the column sample signal and the row sample signal need to be active for the transfer to take place. The disclosed pixel design does not require a shutter signal.

The U.S. patent application No. US 2015/319422 A1 (Fereyre) US2015319422A1 discloses a method for producing images of a three-dimensional scene including information on the distance of each point of the scene, this method uses a pulsed light source and an image sensor, the sensor comprising pixels able to accumulate, in a respective storage node of each pixel, charge generated by the light.

The present disclosure aims to measure TOF directly using a new architecture for a 2D sensor.

SUMMARY OF THE INVENTION

The present disclosure relates to a depth sensing technique in which pixels of a 2D image sensor are driven with individual timings in order to acquire time information on an arrival of photons generating an image. Furthermore, the present disclosure relates to a depth-scanning image sensor (DSIS) that collects depth information by scanning in the depth direction.

An image sensor comprises a plurality of pixels which are controlled by means of control signals.

If pixel operations related to the exposure timings of an individual one of the pixels are controlled in a temporal manner, e.g., synchronized with the emission of, e.g., a light pulse, the pixel operations can be used to gather information on the TOF of the light pulse, amounting to a dTOF measurement. The gathered TOF information can be used to derive depth information.

In order to simplify an implementation of exposure timings, the pixels may be grouped into subgroups so that fewer of the exposure timings need to be implemented for each image.

Subsequent images may have different schemes of the exposure timings assigned to the subgroups of the pixels. Varying ones of exposure timing schemes enable scanning over varying time ranges.

In general, in order to gather depth information over a depth range, a series of images with different exposure timing schemes is acquired. Suppose that, for a specific application, M different exposure timings are required. These M different exposure timings would be applied to every pixel, which would require M different images. However, 3D images often do not require a level of resolution as corresponding 2D images, for which reason there is a possibility of trading off 2D spatial resolution with the number of images required to reconstruct the depth information. By grouping the pixels into subgroups of, e.g., N pixels and applying the M different exposure timings to the pixels of each group, M/N images (or frames) would be required to scan the depth information. The 2D resolution would correspondingly be reduced by a factor of 1/N.

The parameters of light pulse duration, light pulse intensity, light pulse repetition rate, sensor timing within non-overlapping sub-blocks in the photosensing array are controlled by signals that use different timings. The exposure timings together with a light pulse are used to compute distances of objects in a scene by means of Time of Flight (ToF) measurement together with standard 2D imaging.

An imaging device for 3D imaging according to the present disclosure comprises a pixel array comprising a plurality of pixels. The plurality of pixels comprises a plurality of subgroups of pixels and at least one of the plurality of subgroups of pixels comprising depth scanning pixels. The imaging device comprises further); a signal generator for generating an exposure timing scheme defining exposure durations for the least one subgroup of the pixels, wherein ones of the exposure durations cover at least portions between a frame start time and a frame end time of predefined frame; a synchronizer for synchronizing a generation of a light pulse with the exposure timing scheme; and readout circuitry for readout of charges accumulated in the at least one subgroup of the pixels.

The imaging device may further comprise a light source for generating the light pulse.

The at least one subgroup of pixels may comprise a photodiode, a transistor for resetting the photodiode, a floating diffusion, a transistor TX for transferring a charge from the photodiode to the floating diffusion, a transistor for resetting the floating diffusion, a source follower for converting the charge at the floating diffusion into a voltage, and a select transistor for providing the voltage to an output line.

The imaging device may comprise a storage node connected to the input transistor.

At least some of the exposure durations may cover distinct portions between the frame start time and the frame end time.

The imaging device may further comprise a processor for processing the accumulated charges after readout.

The processor may be configured to determine a temporal position of a peak of a reflected light pulse.

The imaging device may further comprise a 2D/3D logic switch for switching between 2D and 3D imaging modes.

The signal generator may comprise a shift register comprised of a series of base blocks, the base block being connected in series and ones of the base block comprising flip-flops.

The shift register further comprises two signal generators connected in series to both ends of the series of base blocks, wherein the two signal generators comprise flip-flops.

A method of 3D imaging of an object using a pixel array is also disclosed. As already note, The pixel array comprises a plurality of subgroups of pixels and at least one of the plurality of subgroups of pixels comprises depth scanning pixels. The method comprises generating a light pulse; exposing the at least one subgroup of pixels of a pixel array, grouped into at least one subgroup of the pixels, to the reflected light pulse, reflected from the object, according to an exposure timing scheme defining exposure durations for the at least one subgroup of the pixels, wherein ones of the exposure durations cover at least portions between a frame start time and a frame end time of predefined frame; reading out charges accumulated in the at least one subgroup of the pixels; determining a temporal position of a peak of the reflected light pulse.

The method may further comprise defining at least some of the exposure durations to cover distinct portions between the frame start time and the frame end time.

The method may further comprise repeating the exposing before the reading-out of the charges.

The method may further comprise repeating the exposing, according to a modified one of the exposure timing scheme and followed by the reading-out of the charges.

The determining of the temporal position of the peak of the reflected light pulse comprises using a linear center-of-gravity formula.

The determining the temporal position of the peak of the reflected light pulse comprises using a non-linear formula.

The non-linear formula may be a non-linear center-of-gravity formula.

One or both of the frame start time and the frame end time of the frame may be defined based on one or more of at least one wavelength of the light pulse, a power of the light pulse, a duration of the light pulse, a repetition rate of the light pulse, a resolution to be achieved, noise, and background light.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The present disclosure relates to an imaging device 100 (see FIG. 14 for an example of the imaging device) and techniques based on semiconductor sensors, and more particularly to creation of 3D images. More particularly, the present disclosure relates to a method for depth sensing and depth scanning by means of a semiconductor imaging device 100. In one aspect, the semiconductor imaging device 100 is a CMOS imaging device.

Figure 1:
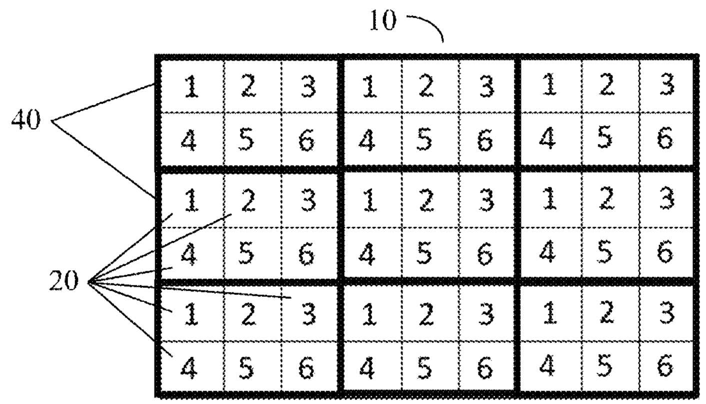
FIG. 1 shows a pixel array divided into non-overlapping blocks of depth-scanning pixels having 2×3 pixels.
Figure 6:
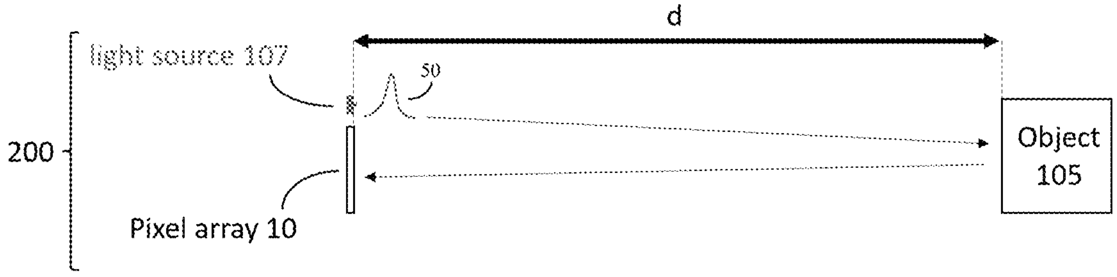
FIG. 6 shows a system according to the present disclosure.

Let us consider a semiconductor imaging device 100 having a pixel array 10 with a number X×Y of pixels 20. The pixels 20 may be of the same type and be constructed in the same way. In the example of FIG. 1, 9×6 pixels 20 are depicted in the pixel array 10. However, it will be appreciated that the pixel array 10 may comprise a different number of pixels 10 as is custom in the art. The pixel array 10 is configured to detect a reflected light pulse 50 generated to irradiate an object 105 to be imaged (see FIG. 6).

The light pulse 50 is generated by a light source 107. The light source 107 is connected to a laser driver 150 and receives control signals from the laser driver 150 relating to generation of the light pulse 50. The light pulse 50 reflected by the object 105 to be imaged is detected by the pixel array 10 by exposing the pixels 20 to the reflected light pulse 50. In one aspect of the disclosure, the imaging device 100 comprises the light source 107. In a further aspect, the imaging device 100 may comprise light guiding means to guide the light pulse 50 in a selected direction to the object 105 to be imaged or a portion thereof.

The light source 107 has characteristics such as at least one wavelength including at least one central wavelength or a main wavelength; a narrow band; a peak power; a light pulse duration; a pulse repetition rate; and an average power. These characteristics may be chosen using the laser driver 150. In one aspect of the disclosure, the semiconductor imaging device 100 is constructed on a silicon substrate, and the at least one wavelength of the light source 107 may be chosen to lie between approximately 0.8 μm and approximately 1.05 μm. In another aspect, the imaging device 100, the range of the at least one wavelength can be extended to approximately 1.55 μm or 1.6 μm. In other words, the range of the at least one wavelength extends from approximately 0.8 μm to 1.6 μm. The light pulse 50 thus may be composed of infrared light (IR). In order to improve the detection of IR radiation, in one aspect of the disclosure, the material of the substrate may be chosen to be a material with higher detection efficiency, e.g., Germanium. Using IR light to generate the light pulse 50 enables human interaction without sensation of the light pulse 50 as the human eye has a low sensitivity for IR light. Furthermore, solar irradiation at ground level may render impossible detecting the light pulse 50 having the at least one wavelength in the visible frequency range. Due to atmospheric absorption there are dips in the IR range of the solar irradiation spectrum at ground level, enabling decreasing a level of background noise from solar irradiation when using light in the IR range for the generation of the light pulse 50. Settings of an average power of the light pulse 50, a peak power of the light pulse 50 a duration of the light pulse 50, and a repetition rate of the light pulse 50 may depend on each other and may furthermore be set in consideration of the object 105 to be imaged and/or imaging conditions such as a distance range, a resolution, and eye safety. In one aspect of the disclosure, the light pulse 50 has a relatively short duration with a relatively high peak power and a repetition rate in the order of the kHz. Furthermore, a field of view (FOV) of the light source 107 may match a FOV of the imaging device 100. The light pulse 50 may illuminate the entire FOV of the imaging device 100, which obviates any need of using the light guiding means.

The X×Y pixels 20 are grouped into one or more subgroups 40 in the pixel array 10. The one or more subgroups 40 are termed depth scanning pixels or DS pixels. It is assumed that M different timings are required to gain sufficient depth information on the object 105 to be imaged. The number M depends on a range of depths (or distances) to be detected (or depth range) and a resolution chosen for the imaging application. Suppose that the depth range is identified by its boundaries $d_1$ and $d_2$, i.e., $d_1 \leq d \leq d_2$. The imaging device 100 will detect ones of the reflected light pulse 50 arriving at the imaging device 100, i.e. at the pixel array 10, in a time range $$\frac{2d_1}{c} \leq t \leq \frac{2d_2}{c}$$

relative to an instant at which the light pulse 50 leaves the light source 107 and travels toward the object 105 to be detected. In order to detect a single one of the reflected pulse 50, repeated exposures of the imaging device 100 may be performed depending on the shape of the reflected light pulse 50, e.g., a time interval spanned by the reflected light pulse 50, and on an exposure timing scheme 45 (explained below). However, it is conceivable that, apart from the single one of the light pulse 50 that repeatedly irradiates the object 105 to be imaged, further ones of the light pulse 50 are used to irradiate the object 105 to be imaged. The further light pulses 50 may have, e.g., different shapes. Depending on the exposure timing scheme 45 and the previously defined time range, the imaging device 100 will perform a certain number (M) of exposures with different exposure timings, as further explained below.

The number of DS pixels 40 in the pixel array 10 can be different from, e.g., smaller than or equal to, the number of pixels 20 in the pixel array 10. If the pixels 20 are divided into a number of DS pixels 40, e.g., A×B DS pixels 40, with A≤X; B≤Y, ones of the DS pixels 40 have a number of (X×Y)/(A×B) pixels 20. We define n=X/A and m=Y/B. A resulting DS resolution of the pixel array is n×m.

In the afore-mentioned example, the pixel array 10 is divided regularly into DS pixels 40, i.e., the DS pixels 40 have a same number of pixels 20. In one aspect of the disclosure, the number X×Y of pixels 20 of the pixel array 10 may be divided into DS pixels 40 in an irregular manner, in which n and m vary across the pixel array 10. In this aspect, the pixel array 10 comprises DS pixels 40 of different sizes, resulting in an image that has a varying DS resolution.

Figure 2:
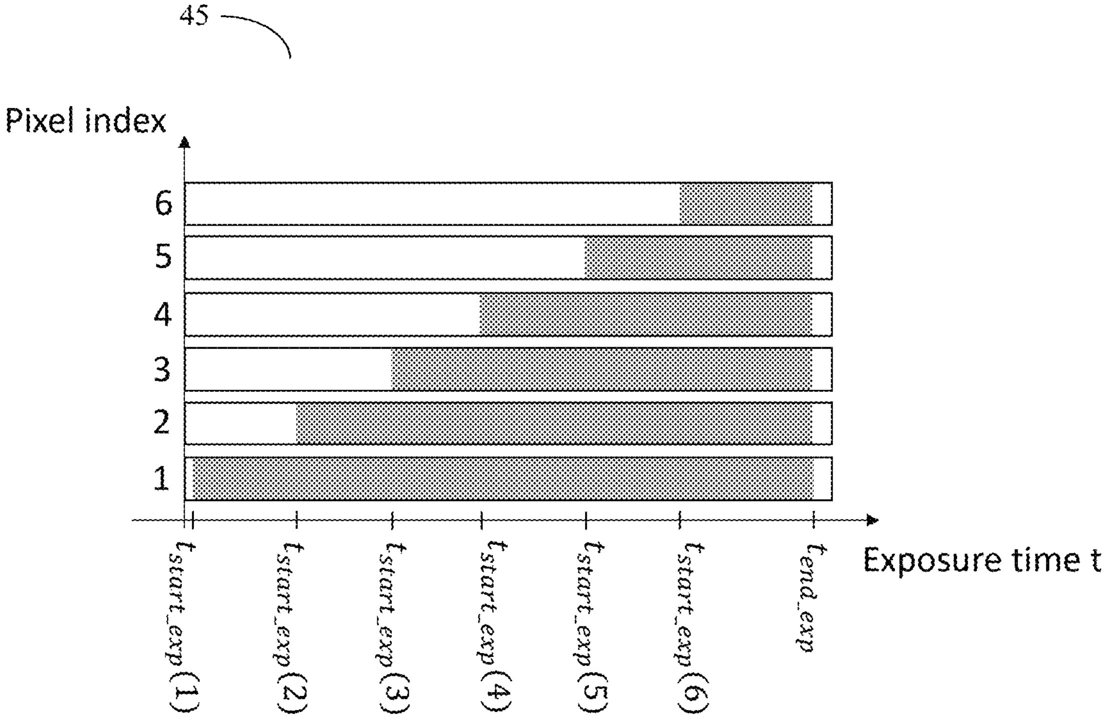
FIG. 2 shows an exposure timing scheme for exposing the 2×3 pixels in one of the DS pixels of FIG. 1.

The subgroups 40 (or DS pixels 40) have n×m pixels 20. In the example of FIG. 1, n=3 and m=2. FIG. 2 shows an example of an exposure timing scheme 45 for the pixels 20 in one of the DS pixels 40. The exposure timing scheme 45 defines the exposure duration for the i-th one of the pixels 20 (also referred to as i-th pixel) of the subgroup 40. For the i-th pixel of the DS pixel 40, i=1, . . . , n×m (with n×m=6 in the example of FIG. 2), the exposure, for the duration of which incoming light from the reflected pulse 50 is integrated, generally starts at a time $t_{start\_exp}(i)$ and ends at a time $t_{end\_exp}(i)$.

In the example shown in FIG. 2, $t_{end\_exp}(i)=t_{end\_exp}$, for i=1, . . . , 6. In other words, the six pixels 20 of the DS pixel 40 stop being exposed to the reflected light pulse 50 at the same time ($t_{end\_exp}$). The i-th pixel in this example thus has an exposure duration of $t_{exp}(i)$ given by the equation $t_{exp}(i)=t_{end\_exp}-t_{start\_exp}(i)$. In this example, the length of the exposure duration $t_{exp}(i)$ decreases with increasing pixel index i. It is to be noted, however, that the exposure scheme 45 shown in FIG. 2 is merely an example of an exposure timing scheme 45.

Other ones of the exposure timing scheme 45 may be adopted. In one aspect, it is possible to start the exposure of the i-th pixel, i=1, . . . , 6, at a common time and distribute or scatter the times when the exposure for the i-th pixel ends. For example, the exposure duration for the first pixel, i=1, may stop first and the exposure duration for the sixth pixel, i=6, may stop last.

In another aspect, the end time of the exposure of the i-th pixel may correspond to the start time of the exposure of another one of the pixels 10 of the DS pixel 40, e.g., but not limited to, of the i+1-th pixel.

Once the exposure timing scheme 45 has been chosen, it is possible to calculate the amount of light received by the DS pixel 40 during the i-th exposure duration $t_{exp}(i)$, i=1, . . . , 6. In the example shown in FIG. 1, the integrated amount of light for the i-th pixel, i=1, . . . , 6, of the corresponding DS pixel 40 during the i-th exposure duration $t_{exp}(i)$, i=1, . . . , 6, see, e.g., FIG. 2, is obtained. The integrated amount of light, e.g., number of photons or amount of light energy received during the i-th exposure duration $t_{exp}(i)$, i=1, . . . , 6, may be inferred from the amount of charge accumulated by the pixel, directly or based on differences between adjacent ones of the pixels 20 in the DS pixel 40.

In general, this method yields n×m exposure durations. The number n×m also indicates the reduction in spatial resolution, when switching from an X×Y pixel array 10 to an A×B DS pixel array (as shown in FIG. 1). The method according to the disclosure enables a reduction in the number of images to be obtained for a 3D point map. The reduction in the number of images, as indicated above, M/(m×n).

To obtain a higher number of exposure durations, it is possible to expose the DS pixel 40 to a subsequent one of the reflected light pulse 50 during a subsequent exposure, after the object 105 has been exposed during a prior exposure. In one aspect, during the subsequent exposure, the exposure timing scheme 45 may be the same as the exposure timing scheme 45 used during the prior exposure. In another aspect, during the subsequent exposure, the exposure timing scheme 45 may be different from the exposure timing scheme 45 used during the prior exposure.

Exposing the DS pixel 40 to a prior one of the light pulse 50 and subsequently to a subsequent one of the light pulse 50 enables detecting the reflected light pulse 50 during a longer period without further reducing the spatial resolution of the pixel array 10. Depending on the size of the pixel array 10, i.e., the number of pixels 20 in the pixel array 10, there is a trade-off between the number of pixels 20 per DS pixel 40, i.e., the reduction in spatial resolution, and the number of irradiations required to gain sufficient depth information on the object 105 to be imaged.

Figure 3:
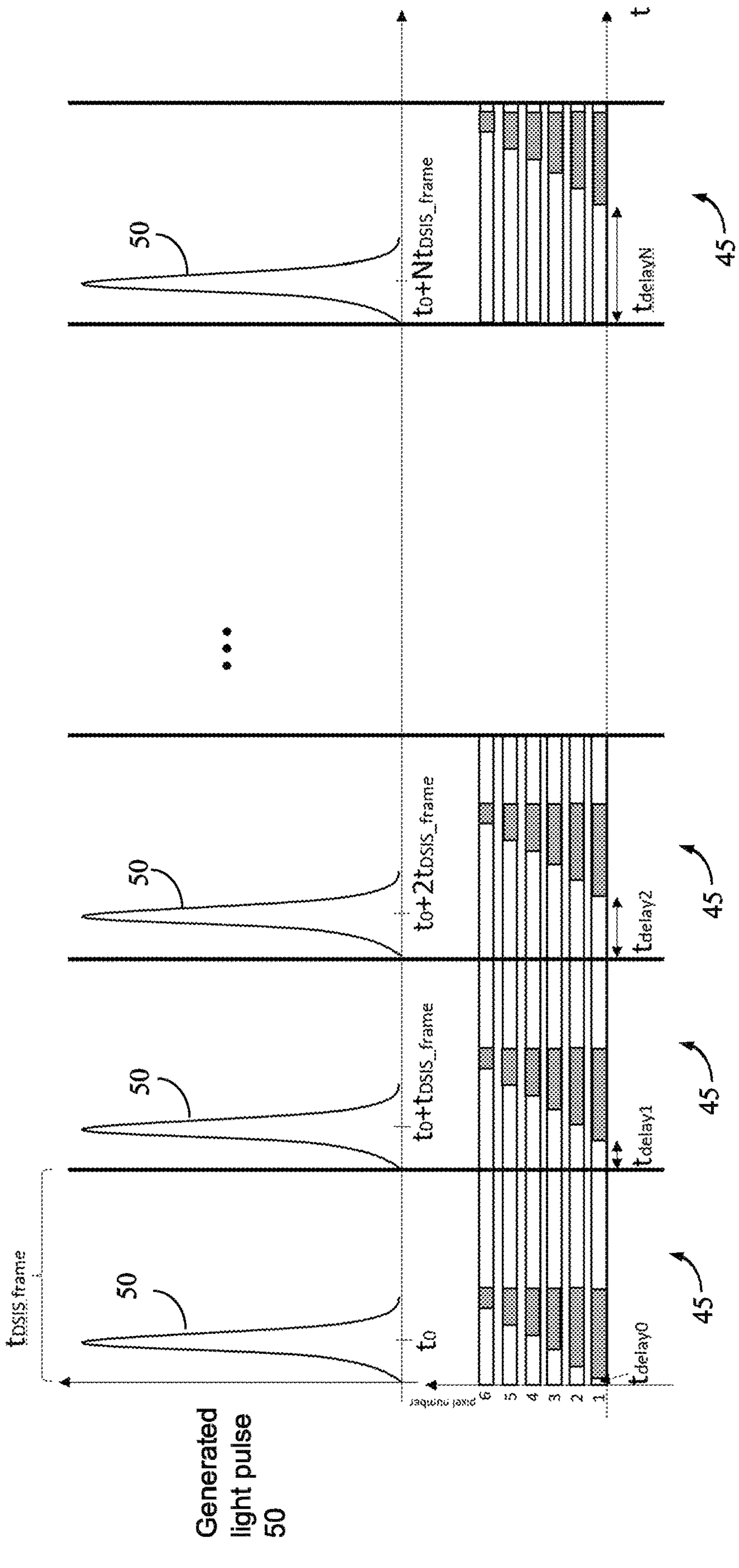
FIG. 3 shows the repetition of the exposure timing scheme of FIG. 2 at varying onsets relative to the time course of a light pulse.

In the aspect of the disclosure shown in FIG. 3, the exposure timing scheme 45 shown in FIG. 2 is repeated. The onset $t_{delay}(k)$ of the exposure timing scheme 45 with respect to a timing of the light pulse 50 is increasingly delayed in repeated exposures during which the exposure timing scheme 45 is used. The exposure timing scheme 45 shown in FIG. 2 is repeatedly applied to the i-th pixel, i=1, . . . , 6, in the DS pixel 40 (or subgroup 40 of pixels 20)

The repeated exposure enables covering a longer time range, e.g., a time range covering at least the time course of the generated light pulse 50 and/or covering at least the time course of the reflected light pulse 50, as shown in FIG. 3. This time range is referred to as DSIS frame in FIG. 3. In the example shown in FIG. 3, the irradiation of the object 105 to be imaged is repeated N times. Subsequent repetitions cover a slightly time-displaced portion of the time course of the light pulse 50. At the end of each DSIS frame and before moving to a different repetition scheme, the sensor needs to be read out.

In some cases, the readout of the sensor takes longer than the acquisition of a single DSIS frame. For example, for a measurement over a 10 m range, the maximum time-of-flight is 66.7 ns. State-of-art readout rates are around 25 billion pixels per second. Hence a megapixel sensor could be read at 40,000 frames per second, which is equivalent to a readout period of 25 μs>>66.7 ns. Most of the power of the sensor is consumed during the readout. The power consumed depends on the detailed architecture of the sensor and may range in about few Watts for very high-speed sensors with many pixels. As explained above, the power of the light pulse 50 needs to be kept low in order to limit the danger risks. Furthermore, an overall power to operate a system 200 (see FIG. 6), comprising the light source 107 and the imaging device 100, has to be considered. It is therefore convenient to repeat the DSIS frame several times without reading the sensor, which is possible with a pixel architecture that allows for charge accumulation. In this case, more charge is accumulated in the i-th pixel by repeating the irradiation of the object 105 to be imaged. If the generated light pulse 50 and the exposure timing scheme 45 remain the same during the repetitions, the charge accumulated by the i-th pixel grows proportionally to the number of repetitions.

The repeated exposure increases the signal-to-noise ratio (SNR). Increasing the SNR is of advantage, e.g., when the available power of the light source 107 is low. In other circumstances, for eye safety considerations, the output power of the light source 107 has to be restricted, and this restriction of the output power may result in results of inferior quality. The repetition of the irradiation of the object 105 with the light pulse 50 enables overcoming situations in which a limited amount of light impinges on the pixel array 10 by increasing the SNR.

The time range covered by the repetitions of the irradiation may depend on the distance d (or on a range of a two-dimensional distribution of distances d when scanning across the object 105 in two dimensions) at which the object 105 to be imaged is arranged from the pixel array 10 and/or from the light source 107. As explained above, the formula $$d = \frac{1}{2} \cdot c \cdot \Delta t$$

relates the distance d between the light source 107 and/or the pixel array 10 as well as the time Δt the light pulse needs to travel twice the distance d. Thus, if the object 105 has a distance of 1 m, Δt=6.7 ns; if the object 105 has a distance of 100 m, Δt=670 ns. Repeating the measurement 1000 times will thus lead to a covered time range of 6.7 μs for a distance of 1 m and to a time range of 0.67 s for a distance of 100 m. Accumulating the charge in the pixels 10 over repeated irradiations thus can be achieved relatively fast Furthermore, charge accumulation reduces time spent for readout of the pixels 10 which is relatively time-consuming, as explained above.

In one aspect, ones of the pixels 10 have an architecture in which a charge storage device is arranged within the pixel architecture. Charge representing the amount of light falling on the pixel is transferred to the charge storage device. The imaging device 100 may further comprise a control device for controlling the transfer of charge to the charge storage device.

In another aspect, a charge storage device may be arranged outside the pixels 20, e.g., at the periphery of the pixel array 10.

An example of a method of imaging the object 105 to be imaged will now be described. However, variations of the described algorithm are possible.

The method according to the disclosure may be improved by the fact that the light pulse may last longer than the accumulated exposure durations of the exposure timing scheme 45.

The method uses interpolation between pixels to achieve a TOF resolution which is better than the exposure time intervals used during exposure of the pixel array 10. The present disclosure is directed to a method that may be referred to as non-linear Center-Of-Gravity (COG). The non-linear COG represents an improvement over the linear COG as it can cope with light pulses 50 of any arbitrary shape, while the linear COG only works well with rectangular light pulses 50. The non-linear COG method is used to determine the temporal position of a peak of the reflected pulse 50. Based on the determined peak position, depth information regarding the object 105 to be imaged is measured, as explained below.

Figure 4:
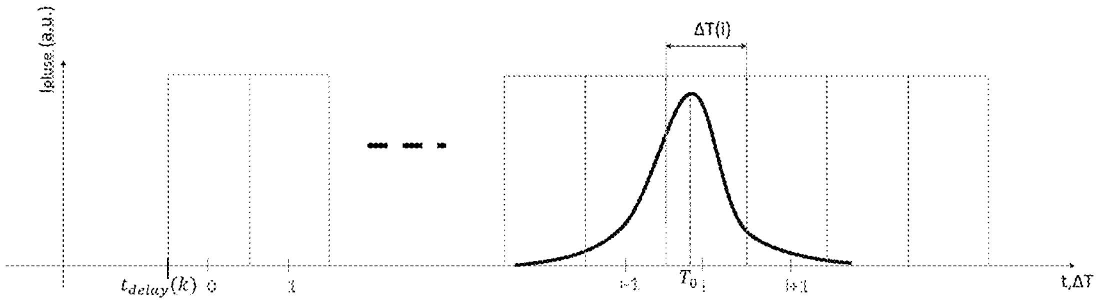
FIG. 4 illustrates the determination of the peak position of a reflected light pulse.

In FIG. 4, the reflected pulse 50 reaching the pixel array 10 is depicted. FIG. 4 illustrates the case for the onset $t_{delay}(k)$ of the exposure timing scheme 45. After the exposure of the i-th pixel, i=1, . . . , n×m, of the DS pixel 40, e.g., with the exemplary exposure timing scheme 45 shown in FIG. 2, subtraction of the integrated charge Q(j), i.e., the charge accumulated during the exposure time $t_{exp}(j)$ and corresponding to the amount of impinging light from the reflected light pulse 50, of adjacent ones of the pixels 20, i.e., j+1-th and the j-th pixels, within a DS pixel 40 is performed.

In this way a series of integrated charges Q(j), j=0, . . . , n×m−1 is obtained. The series of charges Q(j) corresponds to exposure time steps (or exposure time intervals) having time lengths equal to $\Delta T(j)=t_{exp}(j+1)-t_{exp}(j)$ represented in FIG. 4 by boxes. In one aspect, this series of charges Q(j) can also be obtained directly by defining the exposure times $t_{exp}(j)$ not to overlap, in which case the step of subtraction is omitted. In the example of FIG. 2, the exposure times $t_{exp}(j)$ overlap.

The series of charges Q(j) can be regarded as representing a time course of charges accumulated in the DS pixel 40 for the exposure time steps ΔT(j), j=0, . . . , n×m−1, relative to the onset $t_{delay}(k)$. In this case, the exposure time steps ΔT(j) can be regarded as "time points".

In the case shown in FIG. 2, all the exposure time steps ΔT(j) have the same length, i.e., ΔT(j)=ΔT. However, in general the exposure time steps ΔT(j) vary in length.

Accounting more generally for the onset $t_{delay}(k)$ of the exposure timing scheme 45, a set of charges Q(j, k), corresponding to exposure time intervals ΔT(j, k) is obtained. As indicated in FIG. 4, the exposure time steps will be arranged such that there is no overlap between the exposure time steps ΔT(j, k). Furthermore, when comparing two exposure time steps ΔT(j, k) and ΔT(l, m), the exposure time step ΔT(j, k) is prior to the exposure time step ΔT(l, m), if k<m (regardless of the values of j and l) or if both k=m and j<l.

More generally, it is possible that the exposure time steps ΔT(j, k) overlap. The meaning of the exposure time step ΔT(j, k) being prior to the exposure time step ΔT(l, m) is that at least some of time points within the exposure time step (or exposure time interval) ΔT(j, k) occur earlier than the time points within the exposure time step ΔT (l, m). For the sake of simplicity, the case of overlapping exposure time steps ΔT(j, k) is not analyzed below.

When repeatedly exposing the pixel array 10 to the reflected light pulse 50, using a series of the onset $t_{delay}(k)$, the series of charges Q(j, k) can be regarded as representing a time course of charges accumulated in the DS pixel 40 for the exposure times $$t(j,k) = t_{delay}(k) + \sum_{i=0}^{i=j-1} \Delta T(i,k)$$

with j=0, . . . , m×n−1. In case the exposure time steps (or intervals) are constant, these exposure times become $t(j, k)=t_{delay}(k)+j\cdot\Delta T$. In this aspect of the disclosure, the exposure times t(j, k) are defined with respect to the beginnings of the exposure time steps ΔT(j, k).

In another aspect shown in FIG. 4, the center of the exposure time steps (or exposure time intervals) ΔT(j, k) may be taken as reference point for defining the exposure times to be $$t(j,k) = t_{delay}(k) + \frac{\Delta T(j,k)}{2} + \sum_{i=0}^{i=j-1} \Delta T(i,k).$$

In this aspect, the exposure times become $$t(j,k) = t_{delay}(k) + \frac{\Delta T}{2} + j\cdot\Delta T$$

in case the exposure time steps (or intervals) are constant.

Let an index z=1, 2, . . . represent the pairs of indices j and k for a temporally ordered series of ΔT(j, k). In other words, (i, j)→z such that ΔT(z)>ΔT(z') if z>z' for all z=1, 2, . . . . The mapping also defines a corresponding series of accumulated charges Q(z).

To find the temporal position of the reflected light pulse 50, e.g., the temporal position $T_0$ of the peak (see FIG. 4), a search algorithm is run on the series Q(z).

For example, linear filtering can be applied in a first step by convolving the series of accumulated charges Q(z) with a known filter with temporal expression h(z) in order to improve the SNR of the measurement. In a step of selecting, those elements $Q(z_0)$, $Q(z_1)$, . . . of the series Q(z) which are above a certain threshold are selected. The elements $Q(z_i)$, i=1, 2, . . . are further processed in a step of determining neighboring elements $(z_i\pm1)$, $Q(z_i\pm2)$, . . . for the $Q(z_i)$. Based on the determined neighboring elements of $Q(z_i\pm1)$, $Q(z_i\pm2)$, . . . it is possible in a detection step to detect the presence of the reflected light pulse 50, e.g., of the peak of the reflected light pulse 50.

In the case of peak detection, the corresponding element of the series of charges Q(z) may be denoted $Q(z_m)$. Based merely on the element $Q(z_m)$ and on the element $Q(z_{m'})=\max\{Q(z_m-1), Q(z_m+1)\}$, i.e., the one of the two adjacent elements $Q(z_m\pm1)$ having the larger charge value, the temporal position $T_0$ of the peak (see FIG. 4) is determined in a step of determining the peak position.

In one aspect, the step of determining the peak position comprises calculating the temporal position $T_0$ of the peak based on the COG method, i.e. using the linear COG formula $T_0=(Q(z_m)\cdot t(z_m)+Q(z_{m'})\cdot t(z_{m'}))/(Q(z_m)+Q(z_{m'}))$.

In the case of constant exposure time steps (or exposure time intervals), i.e., ΔT(j, k)=ΔT and using the center of the exposure time steps as reference time point, the linear COG formula can be simplified. Defining $Q_{left}$ to be the element of $Q(z_m)$ and $Q(z_{m'})$ that has the smaller index (which is denoted p) and $Q_{right}$ to be the element of $Q(z_m)$ and $Q(z_{m'})$ that has the larger index (which is denoted p+1). With these definitions, the linear COG formula results in $$T_0 = t_{delay}(k) + \frac{\Delta T}{2} + \Delta T\left(p + Q_{right}/(Q_{left}+Q_{right})\right).$$

With the definition $\eta=Q_{right}/(Q_{left}+Q_{right})$, the result can be written as $$T_0 = t_{delay}(k) + \frac{\Delta T}{2} + \Delta T(p+\eta).$$

The foregoing results can be simplified if the rewritten with respect to a reference time $$t_{delay}(k) + \frac{\Delta T}{2}.$$

In this case, $T_0=\Delta T(p+\eta)$.

If the time course of the reflected light pulse 50 is completely included within one exposure time interval (or exposure time step), $Q(z_{m'})$ is zero, which results in η=1 (if $z_{m'}<z_m$) or η=0 (if $z_{m'}>z_m$). If the peak of the reflected light pulse 50 is on the border between adjacent ones of the exposure time intervals then $Q(z_m)=Q(z_{m'})$ (within statistical uncertainty/noise fluctuations) due to the symmetry of the Gaussian form of the reflected light pulse 50, which results in η=0.5.

In implementations of the described method that deviate from the afore-mentioned situations, the variable η assumes different values depending on the relative length in time of the exposure time intervals and the time course of the reflected light pulse 50. In particular, as the size of the exposure time interval shrinks relative to the time course of the reflected light pulse 50, the range in which the defined parameter η varies shrinks accordingly. This means that the above-mentioned case of 0≤η≤1], when the time course of the reflected light pulse 50 is completely included within one exposure time interval, constitutes an upper limit in size (or length) of the range in which the parameter η can vary.

Figure 5:
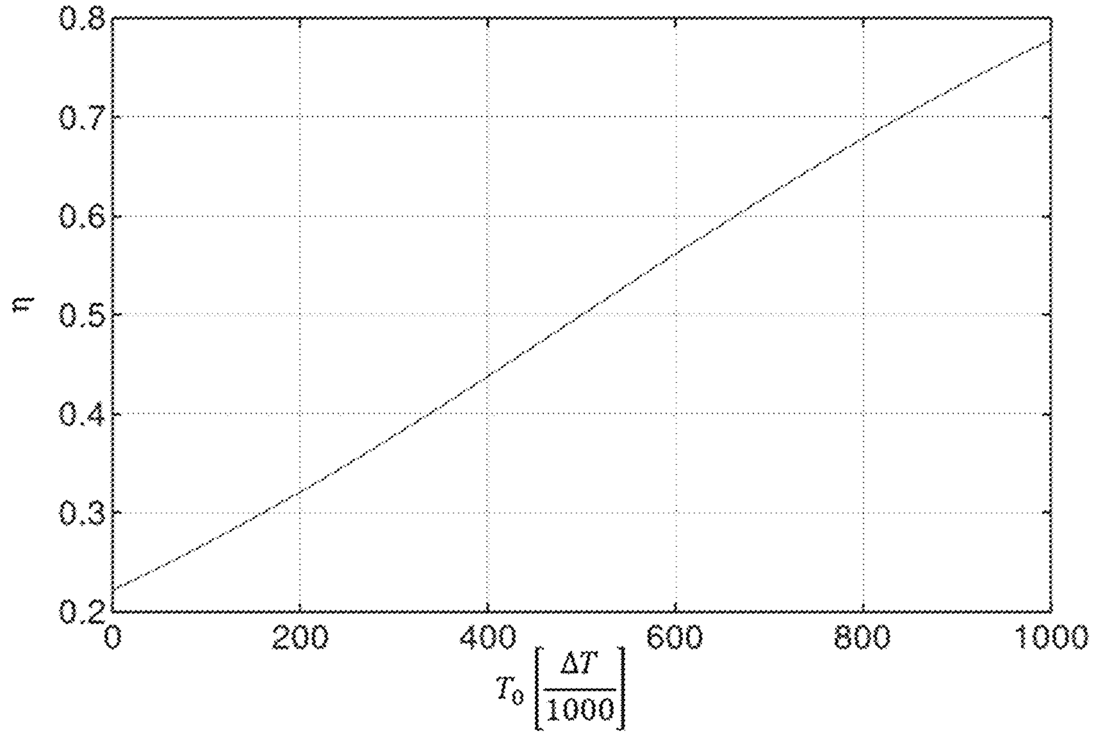
FIG. 5 illustrates a variable η for a reflected light pulse with a Gaussian shape for shifting peak positions of the reflected light pulse.

In FIG. 5, the calculated variable η (y-axis) is shown for a range of temporal positions $T_0$ of the peak of the reflected light pulse 50 (x-axis) between a central position of a given one of the exposure time interval and a central position of a subsequent one of the exposure time interval ΔT. The reflected light pulse 50 has a Gaussian form with σ=5 ns. The time course of the reflected light pulse 50 is thus wider than the selected exposure time interval ΔT=9 ns. As shown in FIG. 5, the variable η is found to be almost linear when the peak position $T_0$ shifts from the central position of the exposure time interval in increments of ΔT/1000 over an interval of length ΔT. The variable η varies between approximately 0.2 and approximately 0.8 (which is a smaller range than the range 0≤η≤1 discussed before).

Figure 7:
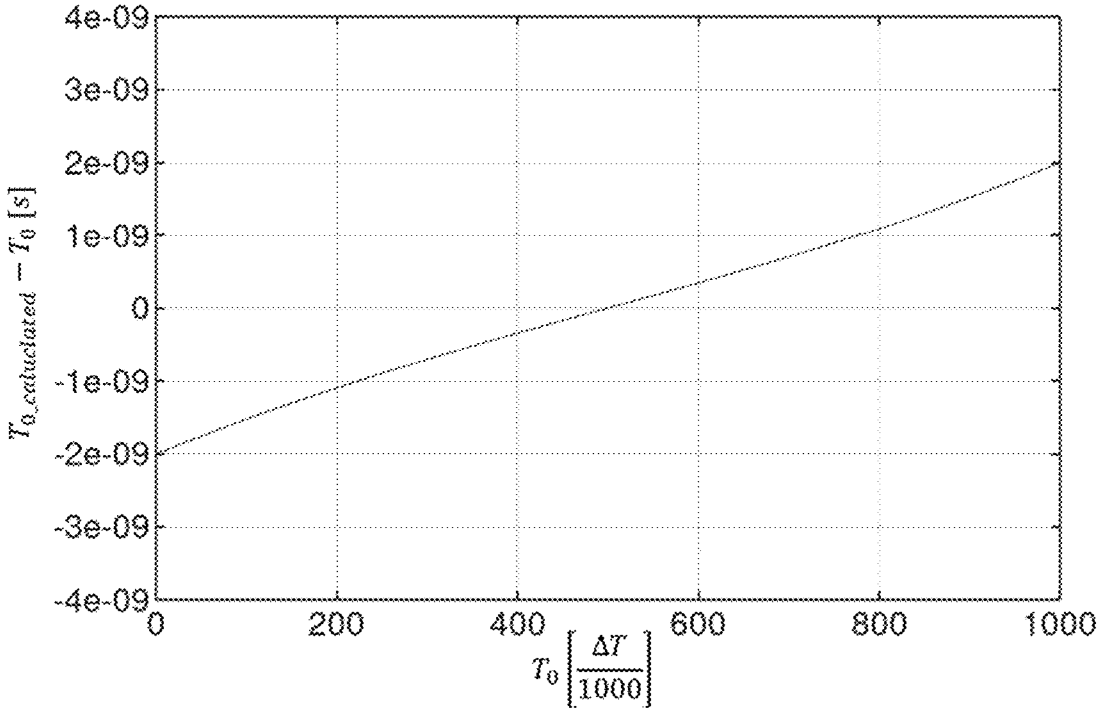
FIG. 7 shows the difference between the linear (calculated) peak position and the non-linear (real) peak position for shifting peak positions of the reflected light pulse.

Depending on the relative length in time of the exposure time intervals and the time course of the reflected light pulse 50, known corrections to the linear relationship will be applied. FIG. 7 shows the difference between the calculated peak position $T_{0\_calculated}$, determined based on the aforementioned linear relationship, and the actual peak position $T_0$ for differently shifted peak positions $T_0$, as in the calculation results shown in FIG. 5.

According to the linear COG formula for the peak position, $$T_0' = T_0 - t_{delay}(k) - \frac{\Delta T}{2} - p \cdot \Delta T = \Delta T \cdot \eta.$$

The linear relationship between η and the relative peak position $$T_0'$$

is thus $$\eta = T_0'/\Delta T.$$

In the more general, non-linear case, the relationship between η and the relative peak position $$T_0' \text{ is } \eta = F(T_0'/\Delta T).$$

By inverting the function F, we obtain $$T_0'/\Delta T = F^{-1}(\eta).$$

As η is measured and F is known, one can calculate $$T_0 = t_{delay}(k) + \frac{\Delta T}{2} + \Delta T * (p + F^{-1}(\eta)).$$

The function F may be determined by calibration of the imaging device 100. The time course of the light pulse 50 may be predetermined for the purpose of the calibration. Furthermore, a structure of the object 105 to be imaged may be predetermined for the purpose of the calibration.

In a step of determining the depth (or distance), the measured temporal position $T_0$ is converted into a depth (or distance) based on the TOF formula.

$$d = \frac{1}{2} \cdot c \cdot T_0.$$

Figure 8:
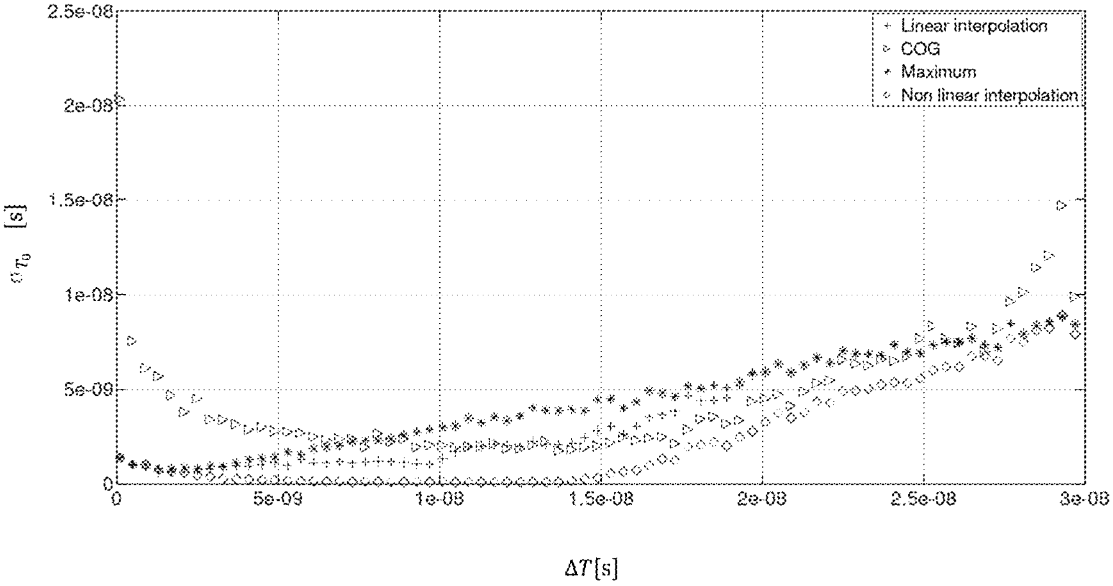
FIG. 8 illustrates the resolution obtained for different peak detection algorithms for varying exposure time steps.

For the purpose of illustration, in a statistical simulation, the function F is numerically calculated based on an ideal reflected light pulse 50 without noise. During the statistical simulation, noise is repeatedly added and a distribution of the peak position $T_0$ is determined. Corresponding results, i.e., the standard deviation of the determined distribution for different calculation methods, are plotted in the FIG. 8, which illustrates the effect of the non-linear COG corrections as compared to the other calculation methods used in the statistical simulation. It can be seen that the non-linear COG interpolation significantly reduces the error in the time measurement.

Figure 9:
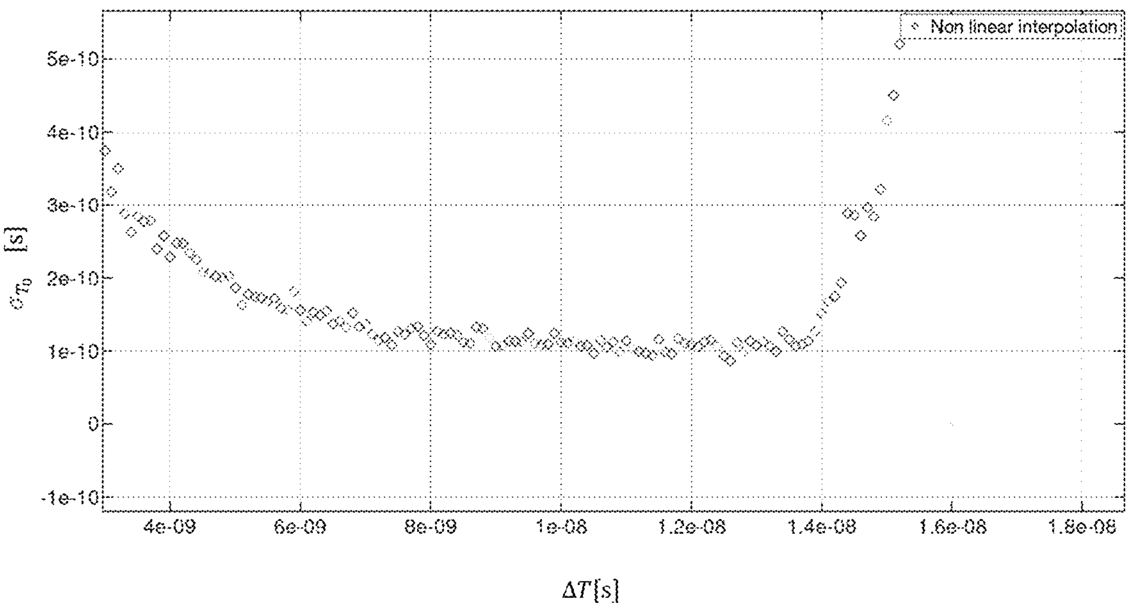
FIG. 9 shows the time resolution of a non-linear center of gravity method for varying exposure time intervals.

For a more detailed view of the achieved time resolution, only the standard deviations for the temporal position $T_0$ of the peak that are obtained with the non-linear COG method are shown in FIG. 9. The simulated time resolution ($\sigma_{T_0}$) was calculated as a function of the exposure time step (or exposure time interval) for a reflected light pulse 50 with a fixed width of 5 ns. Even for a relatively large one of the exposure time step (or exposure time interval) $\Delta T_j$=ΔT=15 ns, the non-linear COG calculation achieves the time resolution to be of the order of 100 ps, which is less than one 100th (1/100) of the exposure time step (or exposure time interval).

In the example described above, two charge values $Q(z_m)$ and $Q(z_{m'})$ from the series Q(z) are used in the non-linear COG method. This should not be considered as a requirement. It is possible to use more samples from the series Q(z) to improve the determination of the time position $T_0$ of the peak. For example, one could use two or more charge values to the right and the left of the peak and calculate the temporal position (x-axis) of the peak of the reflected light pulse 50 based on an adapted non-linear correction formula.

Figure 10:
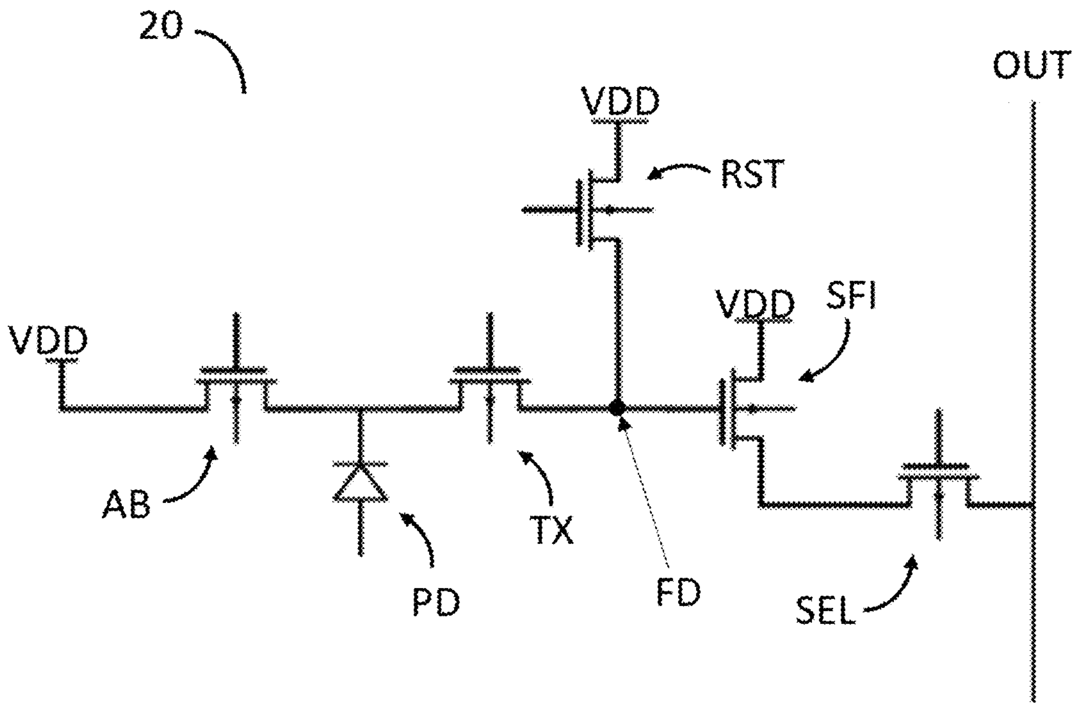
FIG. 10 shows an embodiment of a pixel architecture.

The present disclosure relates to the architecture of the pixel 20 of the pixel array 10. In one aspect of the disclosure, the pixel 20 is a 5T pixel (see FIG. 10) comprising five transistors, e.g., CMOS transistors. A transistor AB is used to reset a photodiode PD node. The transistor AB may further provide for anti-blooming. A transistor TX is used to transfer the integrated charge from the photodiode PD to a floating diffusion FD node which has to be reset before the transfer takes place. A reset of the floating diffusion FD is done by switching on a reset transistor RST. Once the charge reaches the floating diffusion FD, the charge is converted into a voltage by a source follower. The source follower comprises a source-follower input transistor SFI and a current source connected to an output line OUT and located at the periphery of the pixel array 10. The voltage is provided to the output line OUT via the source-follower input transistor SFI and a select transistor SEL. The voltage is detectable at the output line OUT by means of the source-follower input transistor SFI and the select transistor SEL which acts as a switch.

The pixel 20 provides correlated double sampling (CDS) that allows to remove an undesired offset in measuring voltages and/or currents. CDS further enables noise reduction, e.g., a reduction of thermal noise such as kTC noise.

The pixel 20 further provides a global shutter mode and/or a rolling shutter mode. In the global shutter mode, all of the pixels 20 in the pixel array 10 having equal exposure timings and exposure time intervals. The 2D imaging may be performed in rolling shutter mode, enabling increased spatial resolution.

Figure 17:
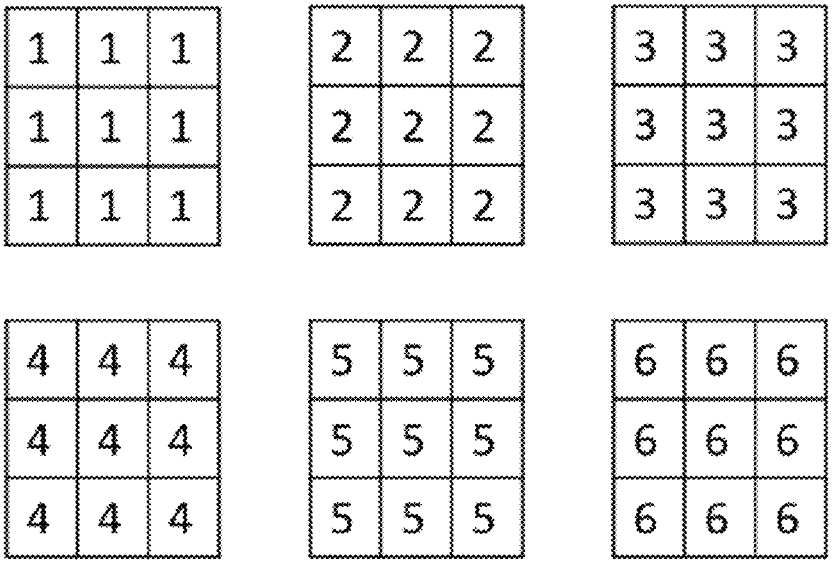
FIG. 17 shows a mode of detection using an imaging device according to one aspect.

In one aspect of the disclosure, 3D imaging may be performed in a DSIS global shutter operation. An example of the DSIS global shutter operation is shown in the exposure timing diagram of FIG. 2. In the DSIS global shutter mode, the i-th pixel of several ones, e.g., all, of the DS pixels 40 of pixel array 10 have equal exposure timings and exposure time intervals. In other words, in the DSIS global shutter mode is equivalent to performing global shutter operations on a sub-array of the pixel array 10 comprising the i-th pixel of the DS pixels 40 for i=1, . . . 6. The series of sub-arrays are consecutively exposed, as shown in FIG. 17.

Other possible embodiments could differ regarding the schematic level or on the layout having a different implementation at process level. At schematic level, a storage node may be added after the source-follower input transistor SFI of the source follower. The storage node allows to store results of the method of the present disclosure and to perform readout of the results while initiating a further implementation of the method.

At a pixel layout and a fabrication level, photodiode doping profiles and shapes can be engineered to make the charge collection faster. For infrared detection using infrared light, i.e., wavelengths of the light pulse 50 and/or of the reflected light pulse 50 ranging approximately from 0.8 um to 1.6 um, which is a preferred wavelength range for 3D imaging or 3D measurements, an absorption length is generally larger than for visible light. The larger absorption length results in at least some of the photons of the light pulse 50 penetrating deeper into a substrate of the photodiode PD. The deeper penetration leads to the charge generated by the light pulse 50 travelling larger distances to a collection node. The faster charge collection enables faster operating of the pixel 20, which is of advantage for 3D imaging.

3D imaging may be performed in the following way. The transistor RST performs the reset of the floating diffusion FD at the start of the frame. Thereafter, the transistor AB and the transistor TX implement timings, such as the exposure timing scheme 45.

Figure 11:
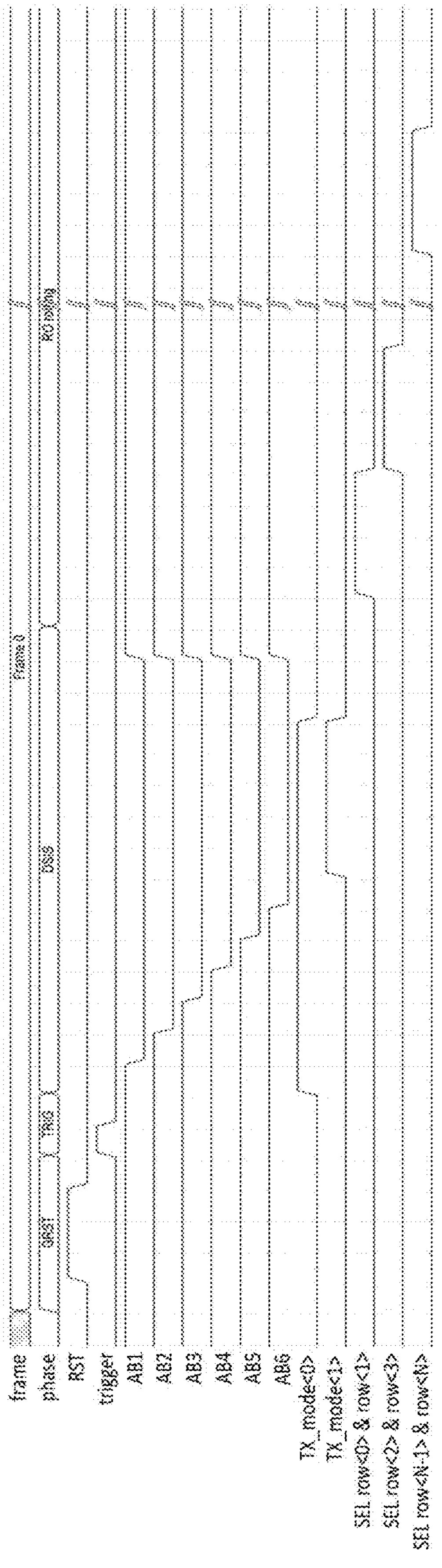
FIG. 11 shows a timing of signals for readout of a DS pixel of the pixel array for 3D imaging.

In FIG. 11, an example of the timing for a 2×3 DS pixel 40 of FIG. 1 is shown to achieve the exposure timing scheme 45 for the 3D imaging of the object 105. However, the timing may be analogously applied to a n×m DS pixel 40. As can be seen from FIG. 11, a frame (referred to as “Frame 0”) comprises a GRST (global reset) phase, a TRIG (trigger) phase, a DSIS (depth-scanning image sensor) phase, and a RO (readout) rolling phase. The frame may be one element of a series of frames.

During the GRST phase, the floating diffusion FD of the i-th pixel, i=1, . . . , 6, is reset by turning on the RST transistor. Furthermore, the photodiode PD of the i-th pixel, i=1, . . . , 6, is freed of any residual collected charge and kept at its pinning voltage by means of the transistors AB.

During the TRIG phase, a trigger is generated internally or externally to start the DSIS phase.

After receiving the trigger, during the DSIS phase, a DSIS synchronizer 110 generates a start pulse signal for a DSIS signal generator 120 to generate the exposure timing scheme 45. The generating of the start pulse for the DSIS signal generator 120 accounts for the onset $t_{delay}(k)$ that has been previously set. The DSIS signal generator 120 generates a signal timing for the transistor AB and the transistor TX of the i-th pixel, i=1, . . . , 6, to reproduce the exposure timing scheme 45, e.g., the exposure timing scheme 45 shown FIG. 2.

As can be seen from FIG. 11, upon generation of the start pulse signal by the DSIS synchronizer 110 during the DSIS phase, an AB signal goes low for the i-th pixel, i=1, . . . , 6, e.g., in a consecutive manner with increasing value of the index i in the shown example.

Furthermore, upon generation of the start pulse signal by the DSIS synchronizer 110 during the DSIS phase, a TX signal goes high. The moment at which the TX signal goes high depends on an operation mode. In a Mode 0, the TX signal goes high shortly after the start pulse signal and before the AB signal goes low for the i-th pixel, i=1, . . . , 6. In a Mode 1, the TX goes high after the AB signal goes low for the i-th pixel, i=1, . . . , 6.

During the DSIS phase, the DSIS synchronizer 110 generates the stop pulse signal which is sent to the DSIS signal generator 120 to end the exposure. The stop pulse signal results in the TX signal going low and charge being transferred from the photodiode PD node to the floating diffusion FD. The AB signal goes high for the i-th pixel, i=1, . . . , 6, which resets the photodiode PD node.

In the RO rolling phase, the i-th pixel, i=1, . . . , 6, is read in a rolling shutter mode. In the rolling shutter mode, rows may be read in pairs.

In an aspect of the disclosure, a CDS (correlated double sampling) phase may be included in the timing after the GRST phase and before the TRIG phase. The CDS phase includes reading the reset level, which is different among the pixels 20 in the pixel array 10 and depends on: (i) the voltage applied at the gate of the RST transistor; (ii) VDD; (iii) charge injection and feedthrough on the FD node; (iv) reset noise (which is characteristic of the CMOS imaging device 100 and due to the fact that a resetting operation effectively samples a voltage on the photodiode node PD); (iv) dark current (which is generally negligible in pixel designs that involve the use of pinned ones of the photodiode PD).

Figure 12:
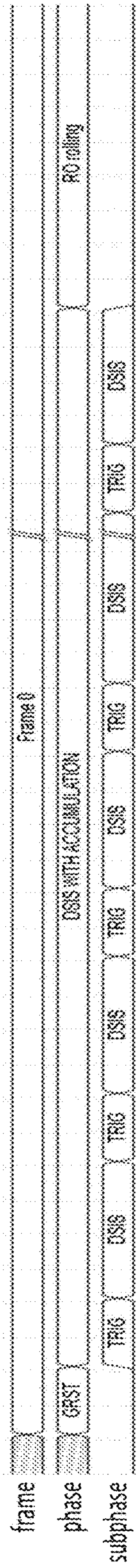
FIG. 12 shows a modified version of the timing shown in FIG. 11.

FIG. 12 shows an aspect of the disclosure that enables accumulation of charge on the floating diffusion FD node. As noted above, the accumulation of charge enables improvement of the SNR. The accumulation of charge is achieved by modifying the timing of the DS pixel 40 of FIG. 11. As in the timing of FIG. 11, the floating diffusion FD node is reset at the beginning of the frame during the GRST phase. The TRIG phase and the DSIS phase follow the GRST phase, as in the timing of FIG. 11, which is repeated as shown in FIG. 12 before reading out the i-th pixel, i=1, . . . , 6 in the RO rolling phase.

In the aspect shown in FIG. 12, within a single one of the frame, several ones of the light pulse 50 are generated and the charge photogenerated by the several ones of the reflected light pulse 50 in the diode is transferred to the floating diffusion FD through the transistor TX during the DSIS phase after each reflected light pulse 50. This is repeated a number n of times such that the charge stored in the floating diffusion FD node is the result of the accumulation of the photogenerated charge due to n generated ones of the light pulse 50. In FIG. 12, the DSIS phase is correspondingly termed DSIS-with-accumulation phase. Once the DSIS-with-accumulation phase is finished, the readout scheme is performed as before during the RO rolling phase.

Figure 13:
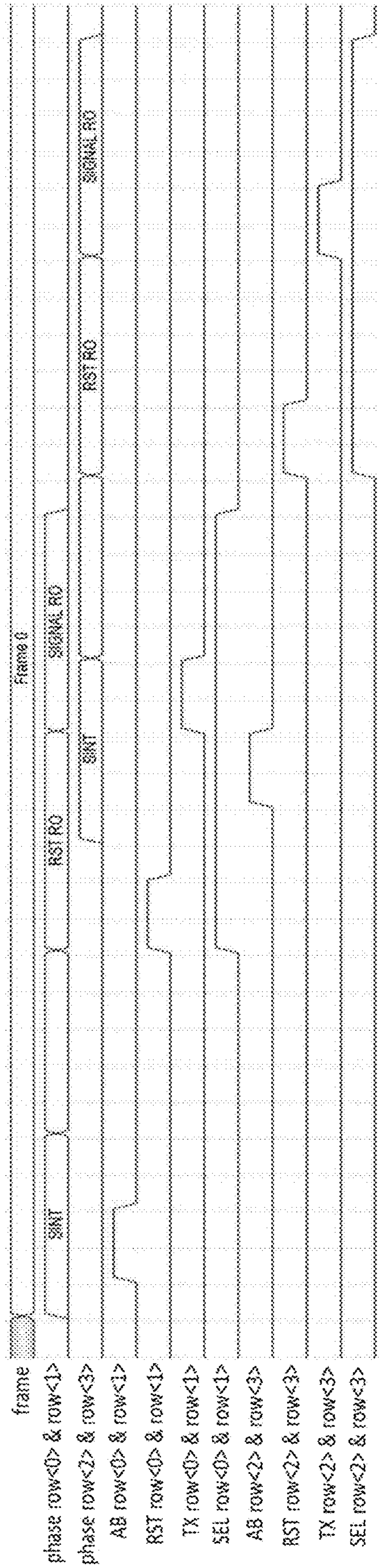
FIG. 13 shows a timing of signals for readout of consecutive rows of a pixel array for 2D imaging.

2D imaging may be performed in the following exemplary way that implements a rolling shutter mode in which light integration (or charge integration) and pixel readout are both controlled row by row. The 2D imaging includes CDS, an example of which is shown in FIG. 13. Timings are shown, in the example of FIG. 13, for consecutive ones of the rows of the pixel array 10. For couples of the rows, a SEL signal (or SEL transistor control signal) is maintained high during at least a portion of a RST RO (reset readout) phase and a SIGNAL RO (signal readout) phase, which allows for reading of both the reset and the signal level values and enables performing CDS.

During a SINT (start integration) phase, the address counter 140 is activated and starts generating the addresses to be sent to the row decoder 145. The row decoder 145 decodes the address and generates a row pointer signal which is sent to the row drivers to start the integration on ones of the pixels 20 belonging to selected consecutive rows of the pixel array 10, e.g., first on rows 0 and 1 and subsequently on rows 2 and 3 in the example of FIG. 13. The AB signal for the ones of the pixels 20 belonging to the selected rows is first set high and then set low to start the exposure. This AB signal ensures that the diode is emptied, i.e., residual collected charge is removed, before the start of a further one of the exposure. This residual collected charge can come from previous ones of the exposure due to incomplete transfer of collected charge to the floating diffusion node during the readout phase. By activating the AB transistor, all the charge accumulated from previous exposures is removed, thus allowing for clean start of the further exposure.

During the RST RO (reset readout) phase, a reset of the floating diffusion FD for the ones of the pixels 20 belonging to the selected rows is performed, when during the RST RO phase the RST signal goes high and subsequently goes low again for the ones of the pixels 20 belonging to the selected rows. A voltage at the floating diffusion node FD due to the accumulated charge is provided to the column output line OUT for readout, when during the RST RO phase for the ones of the pixels 20 belonging to the selected rows the SEL signal goes high and during the SIGNAL RO (signal readout) phase the SEL signals goes low.

After the reset value has been read, for the ones of the pixels 20 belonging to the selected rows an accumulated or integrated charge is transferred from the photodiode PD to the floating diffusion FD for the selected rows by pulsing the transistor TX for the selected rows. Subsequently, the accumulated or integrated charge is transferred to the output line OUT in order to be read, while the SEL signal continues to be high for the ones of the pixels 20 belonging to the selected rows.

After the selected rows have been read out, the foregoing phases will be applied further selected consecutive ones of the rows of the pixel array 10. The selection and readout of rows of the pixel array 10 may be repeated until the pixel array 10 has been completely read. Once the sensor has been read completely the process may start over again from the rows initially selected.

The signal timing described with reference to FIG. 13 is merely a possible signal timing for the rolling shutter readout mode. Other timings, e.g., ones known to the skilled person, may also be applied.

Figure 14:
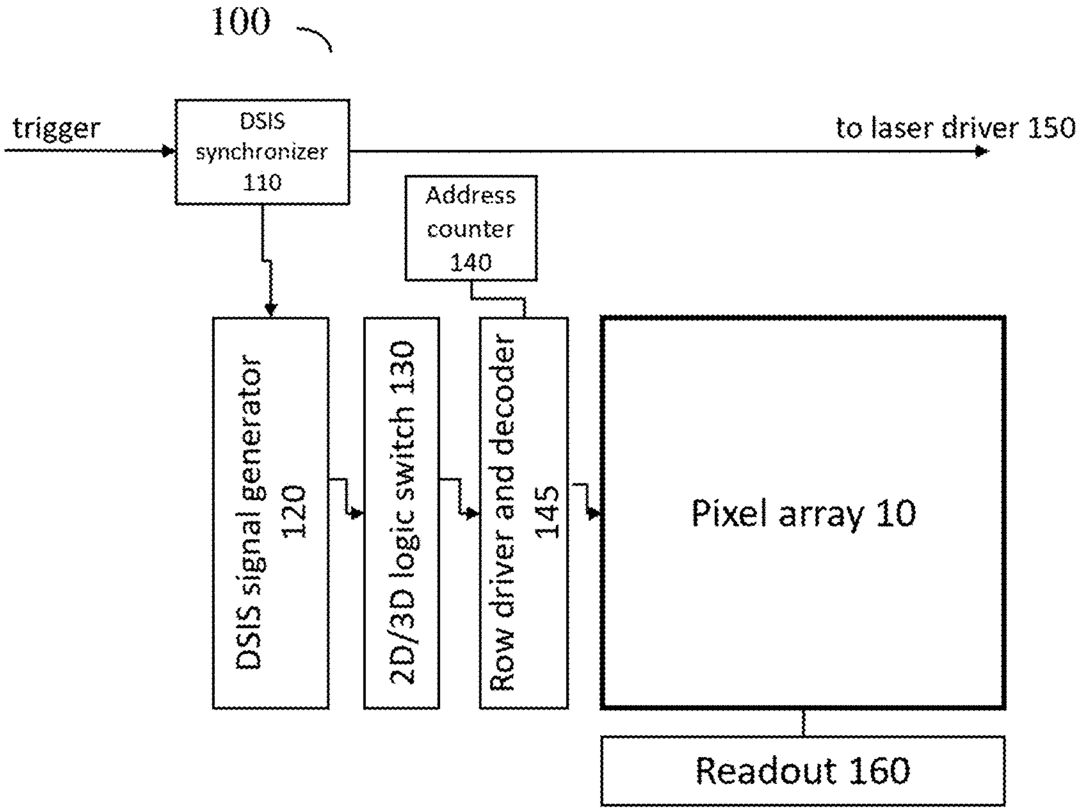
FIG. 14 shows a block diagram of an architecture of an imaging device.

FIG. 14 shows a block diagram of the imaging device 100 according to the present disclosure.

The imaging device 100 comprises the DSIS synchronizer 110. The DSIS synchronizer 110 synchronizes the laser driver 150 with the exposure timing scheme 45. The DSIS synchronizer 110 is programmable to account for the onset $t_{delay}(k)$ of the exposure timing scheme 45.

Figure 16:
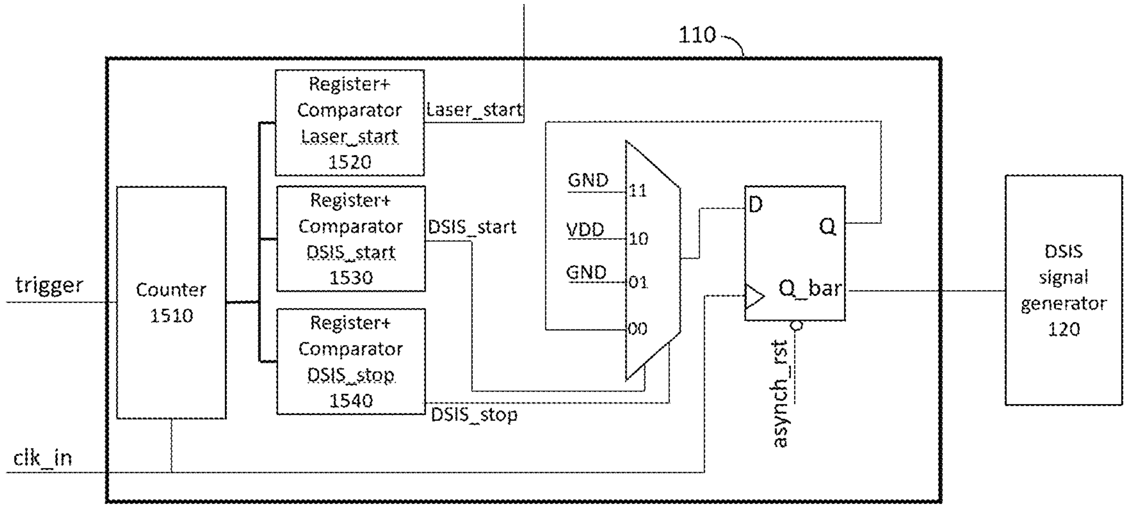
FIG. 16 shows a block diagram of a synchronizer for synchronizing a generation of a light pulse with a controlling of a pixel array.

FIG. 16 shows the DSIS synchronizer 110 in more detail. An externally or internally generated trigger signal (also shown in FIG. 14) initiates a 3D frame or 3D imaging frame. After synchronization with an internal clock by means of a signal clk_in, a counter 1510 starts to count. Three registers are used to store values of delays: a first register 1520 for storing a light-pulse-generation delay (Laser_start), a second register 1530 for storing a start-of-exposure delay (DSIS_start), and a third register 1540 for storing an end-of-exposure-delay (DSIS_stop). The first register 1520, the second register 1530 and the third register 1540 are each coupled to a comparator.

The comparator coupled to the first register 1520 for storing the light-pulse-generation delay generates a Laser_start pulse and passes the Laser_start pulse to the laser driver 150, when the counter reaches the value of the light-pulse-generation delay. The comparator coupled to the second register 1530 for storing the start-of-exposure delay generates a DSIS_start pulse and passes the DSIS_start pulse to a basic state machine to turn on the signal generation for the pixel array 10, when the counter reaches the value of the start-of-exposure delay. The comparator coupled to the third register 1540 for storing the end-of-exposure delay generates a DSIS_stop pulse and passes the DSIS_stop pulse to the basic state machine to turn off the signal generation for the pixel array 10, when the counter reaches the value of the end-of-exposure delay.

Figure 15:
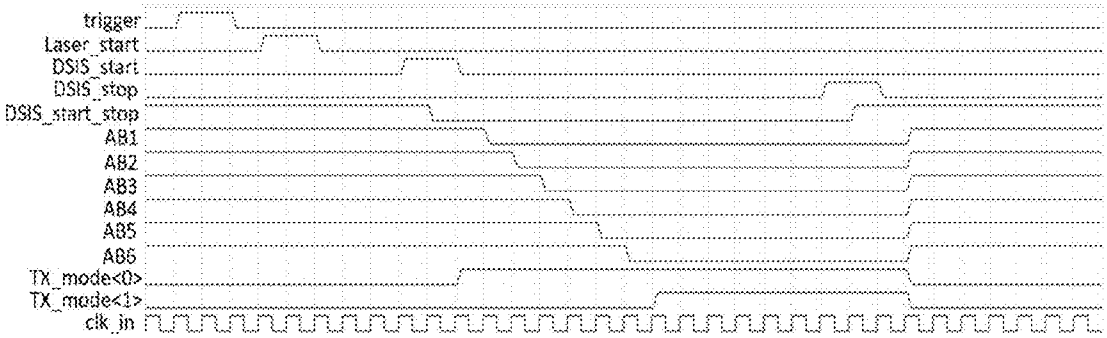
FIG. 15 shows an example of a timing of output waveforms from an operation of a state machine.

The state machine comprises a multiplexer and a D flip-flop. An example of an operation of the state machine is illustrated by means of a timing of output waveforms, shown in FIG. 15. The output of the state machine is a signal referred to as DSIS_start_stop which is used as an input in a DSIS signal generator block 120.

The imaging device 100 further comprises the DSIS signal generator 120, as shown in FIG. 14. The DSIS signal generator 120 generates signals that are fed into a signal distribution network and which eventually reach pixel drivers of the pixels 20 of the pixel array 10. Timings and delays of signals are determined and controlled for the pixel array 10. In one aspect of the disclosure, the signal distribution network comprises one or more clock trees. The signal distribution network may comprise an associated clock tree for each pixel signal, such as the AB signal and the TX signal.

FIG. 17 shows the DSIS signal generator 120. The DSIS signal generator 120 comprises several, i.e., six in the example shown in FIG. 16, ones of a base block 121, corresponding to the number of 2×3 pixels 20 in each DS pixel 40 (see FIG. 1). The several base blocks 121 are connected in series via several ones of an AND gate 122. The number of the base block 121 deployed in the DSIS signal generator 120 may be any number chosen for a specific one of the imaging application. In one aspect, the number of the base block 121 deployed in the DSIS signal generator 120 may be programmable. The programmability enables flexibility in the design of imaging applications. In this aspect, the structure of the pixel array 10 may comprise x-y addressable ones the pixels 20 (such as disclosed in WO 2019/239128).

Figure 18:
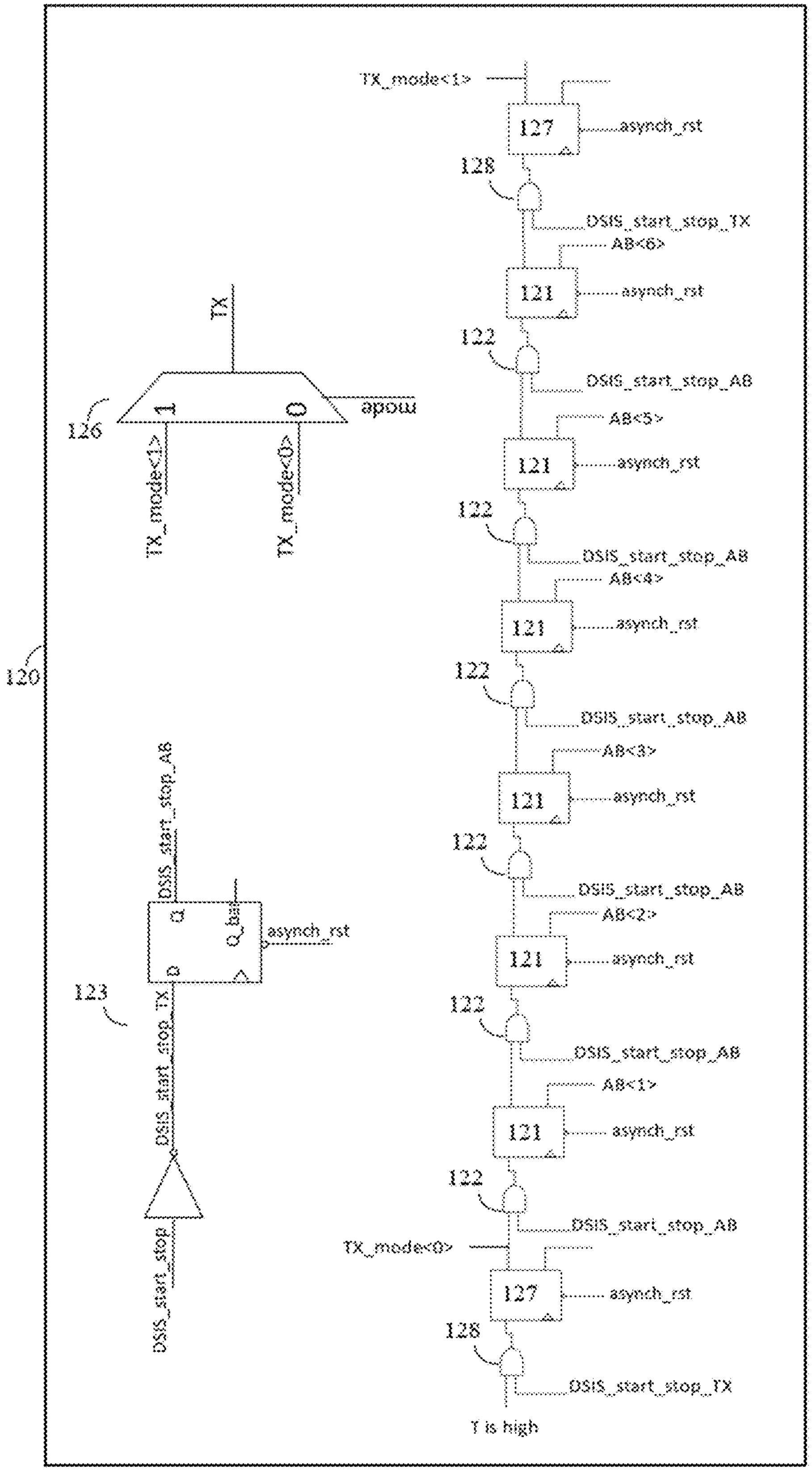
FIG. 18 shows a signal generator.

A DSIS_start_stop_AB-generator 123 receives a DSIS_start_stop signal from the DSIS synchronizer 110. The DSIS_start_stop_AB-generator 123 generates a DSIS_start_stop_AB signal, which is received by the several AND gates 122 connecting the several base blocks 121 of the DSIS signal generator 120. The DSIS_start_stop_AB signal is the result of an inverted and delayed one of the DSIS_start_stop signal from the DSIS synchronizer 110, as shown in FIG. 18.

The DSIS signal generator 120 has an asynchronous reset async_rst. The base blocks 121, as mentioned above, are connected in series, and form a signal generator shift register. The signal generator shift register generates, by means of an inverting of an output of a flip-flop (e.g., a D flip-flop) of the base block, output signals referred to as AB<i>, i=1, . . . , 6, for the i-th pixel, i=1, . . . , 6. As explained above, the number of pixels 20 per DS pixel 40 is not restricted to 2×3=6, but is generally n×m. As shown in FIG. 18, the input of the flip-flop of the base block is the result of a logic AND between a DSIS_start_stop_AB signal and the output of the previous flip flop as shown in FIG. 18 (the first flip-flop in the series outputting AB <1> has the input tied to a high logic value).

The DSIS_start_stop_AB signal is used as a synchronous reset for the DSIS signal generator 120. The DSIS_start_stop_AB signal is received by the several AND gates 122 connecting the several base blocks 121 and sets the outputs of the DSIS signal generator 120 to a known state when the DSIS_start_stop_AB signal is low. The outputs of the DSIS signal generator 120 are inverted ones of the outputs of each flip flop which means that: (i) When DSIS_start_stop_AB is low, the outputs are all kept at high voltage level. (ii) When DSIS_start_stop_AB is high, the output of the flip flop of the base block depends on the output of the flip-flop of the previous base block. Point (ii) describes the phase in which AB signals go low, as explained with respect to FIG. 15 in order to generate the exposure timing scheme 45.

In fact, when DSIS_start_stop_AB is high and as soon as the first rising edge of the clock is hit, the output of the first flip flop goes low. When the second rising edge comes, the output of the second flip flop, which depends on the output of the previous one, goes low. The output is then propagated to the successive flip flop until the end of the series is reached. At this point all the outputs are kept low until the DSIS_start_stop_AB signal turns low again. This event makes all the outputs go high at the same time as soon as the first rising edge of the clock is hit.

Regarding TX signals two operation modes are allowed: In Mode 0, the TX signal goes high from the beginning, before the first AB signal goes low. In Mode 1, the TX signal goes high after the last AB signal goes low.

AB and TX timings are strictly correlated to each other. In one aspect, a TX signal generator generates the TX signal. In this aspect, the TX signal generator is integrated into the previously presented shift register. For example, two blocks 127, 128 comprising a flip flop 127 and an AND gate 128 connected to the flip flop input are added (appended) to the series of the base block 121 of the DSIS signal generator 120. One of the blocks 127, 128 is arranged at one end of the series of the base block 121 for TX_mode<0>. Another one of the block 127, 128 is arranged at the other end of the series of the base block 121 for TX_mode<1> (see FIG. 18). The DSIS_start_stop_TX signal is received by the AND gates 128 connecting the corresponding flip flop 127 and sets the outputs of the corresponding flip flop 127 to a known state when the DSIS_start_stop_TX signal is low. Switching between the two modes is finally performed by a mux 126 which selects the TX signal depending on the operation mode (see FIG. 18).

The imaging device 100 further comprises a 2D/3D logic switch 130, as shown in FIG. 14. The 2D/3D logic switch 130 switches between 2D and 3D imaging modes.

The device 100 according to the present disclosure may comprise a processor for processing the accumulated charges after readout.

The invention claimed is:

1. An imaging device for 3D imaging comprising:
- a pixel array comprising a plurality of pixels;
- the plurality of pixels comprises a plurality of subgroups of pixels, at least one of the plurality of subgroups of pixels comprising depth scanning pixels;
- a signal generator for generating an exposure timing scheme defining exposure durations for the at least one subgroup of the pixels, wherein ones of the exposure durations cover at least portions between a frame start time and a frame end time of a predefined frame;
- a synchronizer for synchronizing a generation of a light pulse with the exposure timing scheme; and
- readout circuitry for readout of charges accumulated in the at least one subgroup of the pixels; wherein the at least one subgroup of pixels comprise a photodiode, a transistor for resetting the photodiode, a floating diffusion, a transistor TX for transferring a charge from the photodiode to the floating diffusion, a transistor for resetting the floating diffusion, a source follower for converting the charge at the floating diffusion into a voltage, and a select transistor for providing the voltage to an output line.

2. The imaging device of claim 1, further comprising a light source for generating the light pulse.

3. The imaging device of claim 1, further comprising a storage node connected to the input transistor SF.

4. The imaging device of claim 1, wherein at least some of the exposure durations cover distinct portions between the frame start time and the frame end time.

5. The imaging device of claim 1, wherein the imaging device further comprises a processor for processing the accumulated charges after readout.

6. The imaging device of claim 5, wherein the processor is configured to determine a temporal position of a peak of a reflected light pulse.

7. The imaging device of claim 1, further comprising a 2D/3D logic switch for switching between 2D and 3D imaging modes.

8. The imaging device of claim 1, wherein the signal generator comprises a shift register comprised of a series of base blocks, the base block being connected in series and ones of the base block comprising flip-flops.

9. The imaging device of claim 8, wherein the shift register further comprises two TX signal generators connected in series to both ends of the series of base blocks, wherein the two TX signal generators comprise flip-flops.

10. A method of 3D imaging of an object using a pixel array, wherein the pixel array comprises a plurality of subgroups of pixels and at least one of the plurality of subgroups of pixels comprises depth scanning pixels, and wherein the at least one subgroup of pixels comprise a photodiode, a transistor for resetting the photodiode, a floating diffusion, a transistor TX for transferring a charge from the photodiode to the floating diffusion, a transistor for resetting the floating diffusion, a source follower for converting the charge at the floating diffusion into a voltage, and a select transistor for providing the voltage to an output line, the method comprising:
- generating a light pulse;
- exposing the at least one subgroup of pixels of a pixel array to the light pulse, reflected from the object, according to an exposure timing scheme defining exposure durations for the at least one subgroup of the pixels, wherein ones of the exposure durations cover at least portions between a frame start time and a frame end time of predefined frame;

reading out charges accumulated in the at least one subgroup of the pixels;

determining a temporal position of a peak of the reflected light pulse.

11. The method of claim 10, further comprising defining at least some of the exposure durations to cover distinct portions between the frame start time and the frame end time.

12. The method of claim 10, comprising repeating the exposing before the reading-out of the charges.

13. The method of claim 10, comprising repeating the exposing, according to a modified one of the exposure timing scheme and followed by the reading-out of the charges.

14. The method of one of claim 10, wherein the determining of the temporal position of the peak of the reflected light pulse comprises using a linear center-of-gravity formula.

15. The method of one of claim 10, wherein the determining of the temporal position of the peak of the reflected light pulse comprises using a non-linear formula.

16. The method of one of claim 10, wherein the non-linear formula is a non-linear center-of-gravity formula.

17. The method of one of claim 10, wherein one or both of the frame start time and the frame end time of the frame are defined based on one or more of at least one wavelength of the light pulse, a power of the light pulse, a duration of the light pulse, a repetition rate of the light pulse, a resolution to be achieved, noise, and background light.

* * * * *